United States Patent

[11] 3,628,752

[72] Inventor Evan A. Edwards
 Rochester, N.Y.
[21] Appl. No. 19,424
[22] Filed Mar. 13, 1970
[45] Patented Dec. 21, 1971
[73] Assignee Eastman Kodak Company
 Rochester, N.Y.

[54] DEVICE FOR STRIPPING AND FEEDING STRIP MATERIAL FROM A ROLL
10 Claims, 5 Drawing Figs.

[52] U.S. Cl. .................................................. 242/192
[51] Int. Cl. ......................................... G11b 15/32,
 G11b 15/66
[50] Field of Search .......................................... 242/192,
 195, 186, 188, 201, 206, 202, 208, 209, 210, 207,
 197, 198, 71.1, 204; 352/157, 72, 158, 78; 226/91,
 92

[56] References Cited
UNITED STATES PATENTS
3,429,518 2/1969 McKee ........................ 242/186
3,550,880 12/1970 Palmer ........................ 242/192
3,550,881 12/1970 Roman ........................ 242/192

Primary Examiner—George F. Mautz
Attorneys—Robert W. Hampton and G. Herman Childress ABSTRACT: A stripping mechanism for use in strip material handling devices, such as motion picture projectors, for unwinding strip material from a roll and guiding the unwound portion away from the roll periphery along a predetermined path. The mechanism includes a strip-feeding belt for rotating the roll in an unwinding direction and a stripper finger for deflecting the leading edge of the strip material away from the roll periphery and into a strip guiding channel formed by opposing substantially parallel surfaces of the drive belt and stripping finger. Both the drivebelt and stripper finger are mounted for pivotal movement about a common axis, thereby permitting the surfaces forming the strip-guiding channel to maintain a fixed relationship as the mechanism pivots into engagement with rolls of various diameters.

EVAN A. EDWARDS
INVENTOR.

BY *J. Herman Childress*
*Robert W. Hampton*
ATTORNEYS

EVAN A. EDWARDS
INVENTOR.

EVAN A. EDWARDS
INVENTOR.

3,628,752

DEVICE FOR STRIPPING AND FEEDING STRIP MATERIAL FROM A ROLL

CROSS-REFERENCES TO RELATED APPLICATIONS

Reference is made to the following commonly assigned copending U.S. Patent applications; Ser. No. 731,377, filed May 23, 1968, in the name of Allan M. Palmer, entitled FILM STRIPPING MECHANISM; now U.S. Pat. No. 3,559,880 and Ser. No. 685,616, filed Nov. 24, 1967 in the name of John J. Bundschuh and Robert J. Roman, entitled CINEMATOGRAPHIC PROJECTORS OR THE LIKE AND CARTRIDGES FOR USE THEREWITH, now U.S. Pat. No. 3,552,683.

BACKGROUND OF THE INVENTION

The present invention relates to cartridge loading motion picture projectors and more particularly to film stripping mechanisms adapted for use in such projectors for extracting film from a film cartridge and guiding the extracted portion toward the projection gate.

Earlier film stripping mechanisms, such as described in the previously mentioned copending applications and in U.S. Pat. No. 3,429,518 to McKee, include an endless belt which is pivotally movable into a cartridge for engaging a roll of film therein and for driving the film roll in an unwinding direction, and a stripper finger which is also pivotally movable into the cartridge for deflecting the end portion of the film from the roll and into a narrow film guiding channel formed by opposing and substantially parallel surfaces of the film-feeding belt and stripper finger. Because of the desirability of maintaining the dimensions of the film-guiding channel substantially uniform independent of the diameter of the film roll on which the mechanism acts, means have been devised for establishing and maintaining the relative relationship of the stripper finger and the film-feeding belt at a time when both elements are engaging the film roll. Such means are desirable in earlier stripping mechanisms because the stripper finger and the film-feeding belt are pivotally mounted for movement about independent spaced pivot points and consequently enter the film cartridge from different directions. Thus, the position of one of the stripping elements (usually the stripper finger) is adjusted to maintain a uniformly dimensioned film-guiding channel for film rolls of widely varying diameters. Although earlier mechanisms have proved quite satisfactory in operation, it has been deemed desirable to devise an alternate arrangement which is somewhat simpler in construction, yet capable of providing the desired constant spacing or relation between the stripper finger and the film-feeding belt.

SUMMARY OF THE INVENTION

Accordingly, among the important objects of the present invention is the provision of an improved film-stripping mechanism which is simpler in construction than prior art mechanisms. In accordance with a preferred embodiment of the invention a drive means and a film-stripping member are mounted for pivotal movement about a substantially common pivot axis into and out of engagement with a film roll, whereby the drive means and stripping member can be both pivotally moved into engagement with the roll with a predetermined relationship between the relative positions of the drive means and the stripping member.

In accordance with a preferred embodiment of the invention, both the strip-feeding belt and the stripper finger are mounted for pivotal movement about a common axis. Thus, the strip-feeding belt and the stripper finger can pivot into the film cartridge in precisely the same direction, thereby permitting the relative positions of the channel forming surfaces of the belt and the stripper finger to be maintained constant throughout the pivotal movement of the stripping mechanism. Thus, the dimensions of the film guiding channel are maintained uniform or constant irrespective of the diameter of the film roll contained by the cartridge.

The invention and its other objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIGS. 1 and 2 are diagrammatical side elevational views illustrating a film stripping mechanism according to the invention in two different positions with respect to a cartridge containing a roll of motion picture film or the like;

In the several views of the apparatus presented in the drawings, corresponding reference characters represent corresponding parts.

DETAILED DESCRIPTION OF A PREFERRED EMBODIMENT

Because motion picture projectors are well known, the following description will be directed in particular to elements forming part of, or cooperating more directly with, the present invention. It is to be understood that projector elements not specifically shown or described may take any of the various forms well known to those skilled in the art.

Figure 1:
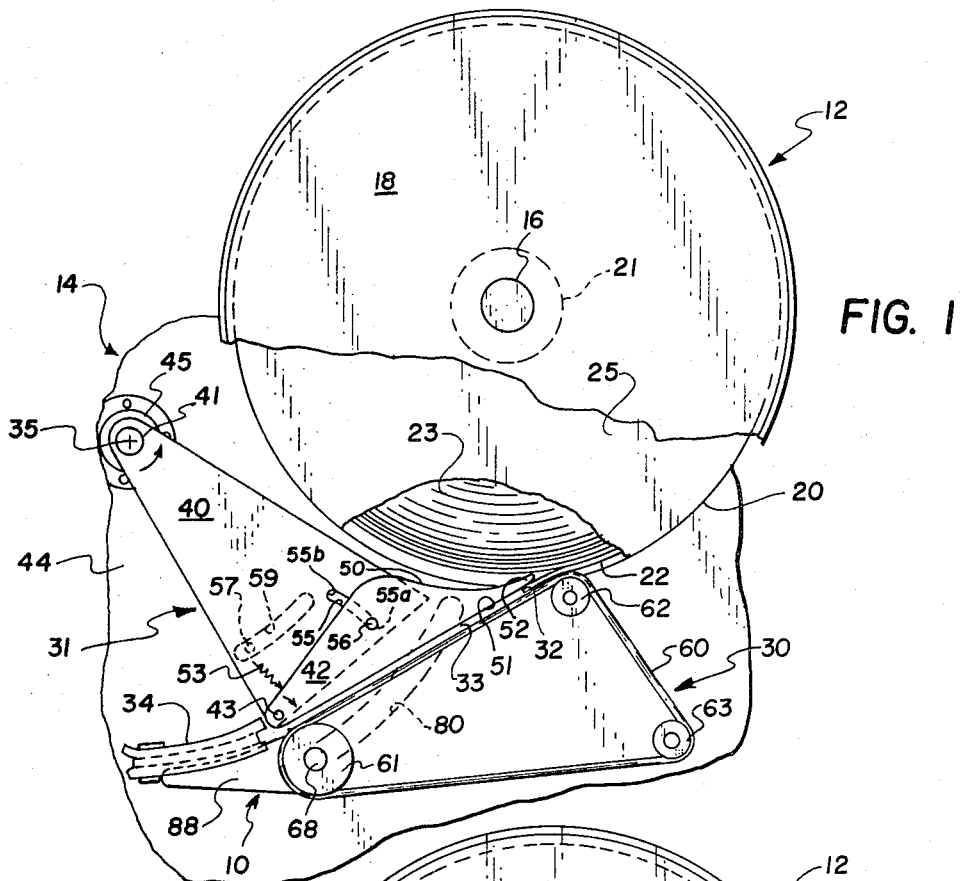
Figure 2:
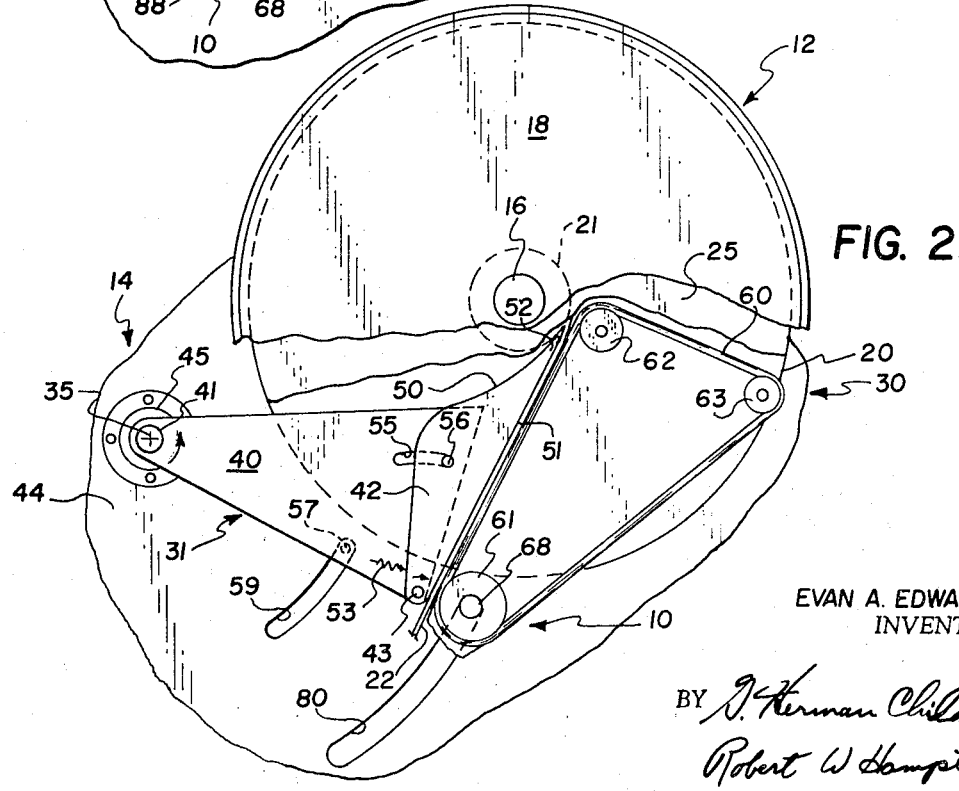

Referring now to the drawings, FIGS. 1 and 2 depict a film-stripping mechanism 10 embodied by the present invention in two different positions with respect to a film cartridge 12 of the type adapted for use with conventional cartridge-loading motion picture projectors. Cartridge 12 is supported relative to the projector housing 14 (shown fragmentally) by cooperating orienting structure (not shown) on the cartridge and projector which orients the cartridge relative to the stripping mechanism in the manner shown. Latch means may be provided for holding the cartridge in place on the projector. A portion of the cartridge housing 18 is cutaway to expose a duoflanged film reel 20 which is located within the cartridge housing and rotatively mounted on a projector spindle 16. Wound upon the hub 21 of reel 20 is a film strip 22, the convolutions of which form film roll 23, shown in FIG. 1, wherein a portion of the outer flange 25 of reel 20 is cutaway to expose the roll.

Stripping mechanism 10 generally comprises a drive means or film-feeder 30 for rotating roll 23 in an unwinding direction, and a stripper member or finger 31 for deflecting the leading edge 32 of film strip 22 away from the roll periphery and into a narrow channel 33 formed by opposing parallel surfaces of film feeder 30 and stripper finger 31. Channel 33 serves to direct film strip 22 into a film guide 34 (shown in FIG. 3) which defines a portion of the threading path for film through the projector. Mounting means, described below, are provided for pivotally mounting both film feeder 30 and stripper finger 31 for movement about a common axis 35 whereby the mechanism can be pivoted into engagement with roll 23 without affecting the parallel relationship or spacing between the surfaces defining channel 33.

Stripper finger 31 comprises a carrier or support arm 40, mounted for pivotal movement about axis 35, on a shaft 41, and a stripping member 42, mounted for pivotal movement about a pin 43 which extends outwardly from support arm 40 at a corner thereof. Shaft 41 extends perpendicularly from both sides of a sidewall 44 of projector housing 14 and is rigidly mounted on the sidewall by a collet 45 (shown in FIGS. 3 and 4).

Figure 5:
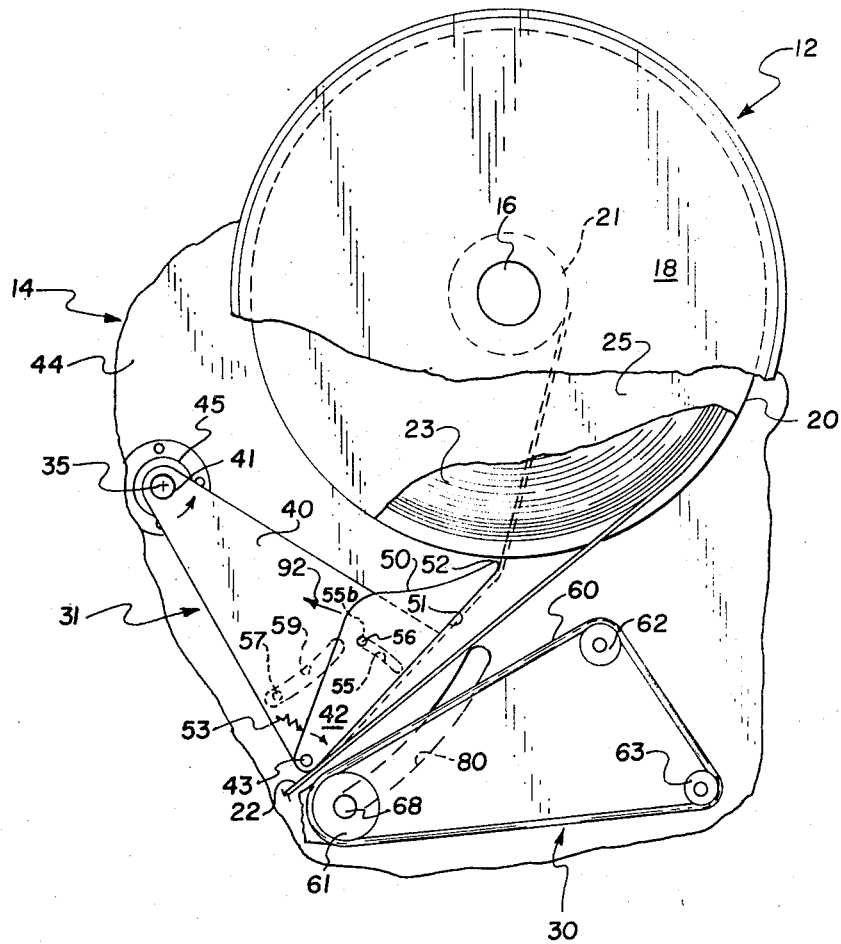
FIG. 5 is a diagrammatical side elevational view illustrating another position of the stripping mechanism.

Stripping member 42 comprises an irregularly shaped member having an arcuate edge 50 which meets a substantially straight edge 51 at a rounded end portion 52. End portion 52 is the only portion of the stripper finger which normally engages the film roll and, in operation, it tends to lift up and separate the leading edge 32 of film strip 22 from the periphery of the film roll as the roll rotates in an unwinding direction. Conventional spring means shown diagrammatically at 53 are provided for biasing the stripping member about pin 43 in a clockwise direction as indicated by the arrow. To limit the extent of pivotal movement permitted stripping member 42, a slot 55 is provided in support arm 40 and a pin 56 secured to and extending rearwardly from the stripping member protrudes through the slot. When the stripper finger is in position to engage the film roll, as shown in FIGS. 1 and 2, pin 56 is urged toward and normally engages the lower end 55a of slot 55. When the stripper finger is in position to engage the film roll, as shown in FIGS. 1 and 2, pin 56 is urged toward and normally engages the lower end 55a of slot 55. When the stripper finger is positioned so that it is out of contact with the film roll, as shown in FIG. 5, the pin 56 will be urged in an upper end 55b of slot 55 in a manner and for purposes described below.

Figure 3:
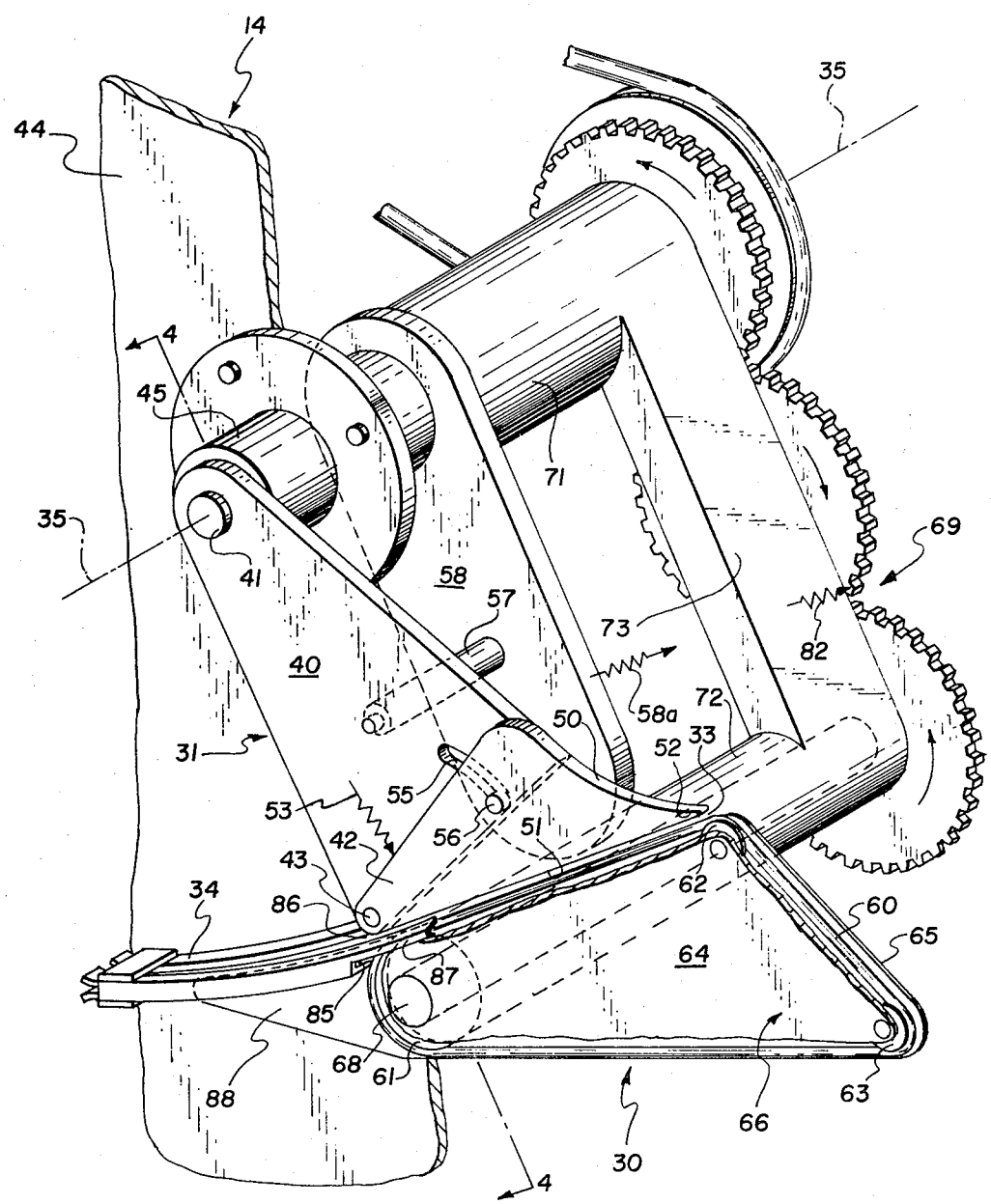
FIG. 3 is a perspective view of the stripping apparatus comprising a preferred embodiment of the invention.
Figure 4:
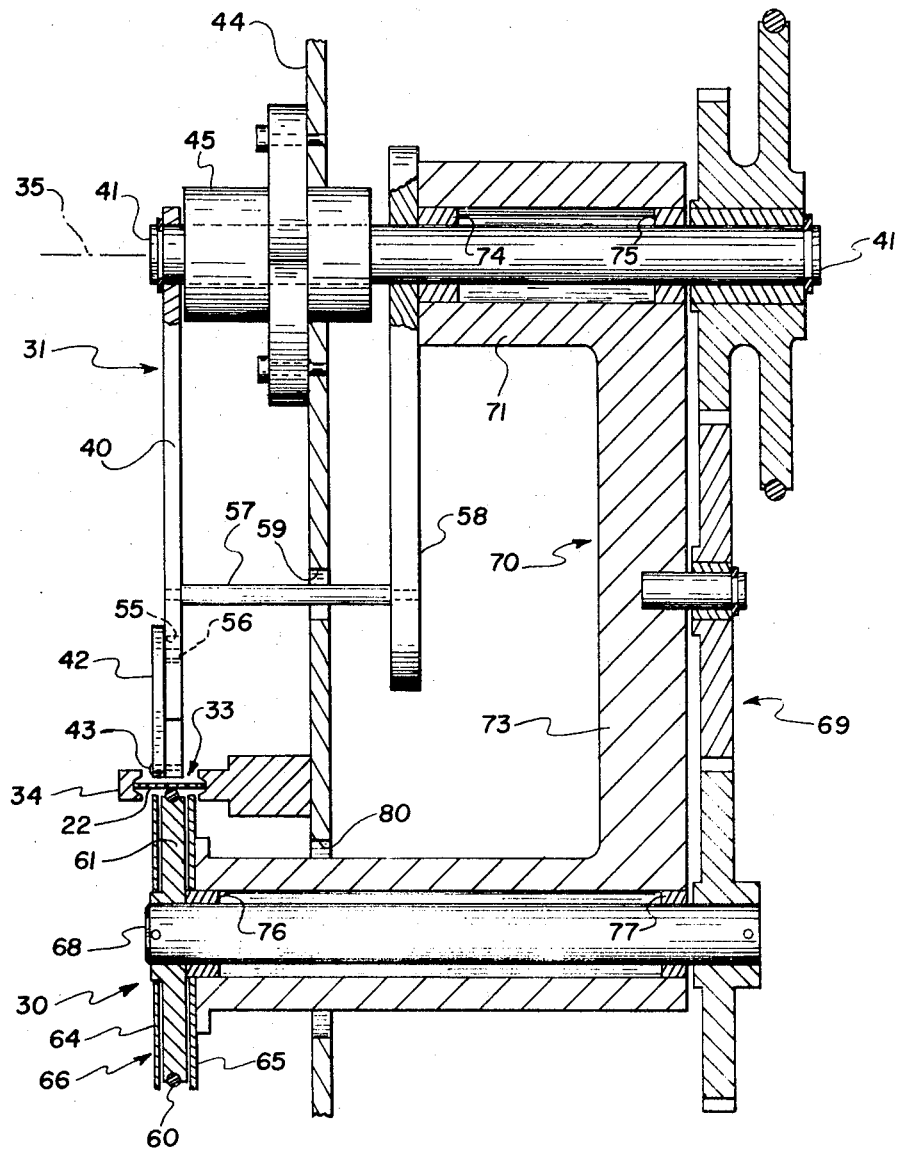
FIG. 4 is a cross-sectional view of the apparatus depicted in FIG. 3 taken along the line 4—4.

To urge the stripper finger into engagement with the film roll during the stripping operation, support arm 40 is spring biased for rotation counterclockwise about shaft 41 as indicated by the arrow adjacent shaft 41. Preferably, such spring biasing is provided from the rear side of the projector sidewall 44. As shown in FIGS. 3 and 4, support arm 40 is coupled, via connecting rod 57 with a pivot arm 58 which is pivotally mounted on shaft 41 on the rear side of sidewall 44. Connecting rod 57 extends through an arcuate slot 59 formed in the projector sidewall 44. Slot 59 has a center of curvature coinciding with axis 35. Pivot arm 58 is spring biased by conventional spring means shown diagrammatically at 58a in FIG. 3 to urge support arm 40 toward engagement with the film roll periphery.

The longitudinal length of slot 59 defines the limit of the pivotal movement of the stripper finger. Preferably, slot 59 is long enough to permit the rounded end portion 52 of the stripper finger to engage the core 21 of film reel 20 (or at least a very small roll of film) at one extreme, and to permit the stripper finger to be positioned and retained out of engagement with a full film roll at the other extreme. The two extreme positions of the stripper finger are shown in FIGS. 2 and 5.

Referring additionally to FIGS. 3 and 4 film feeder 30 comprises an endless belt 60 trained about a drive pulley 61 and two idler pulleys 62 and 63. The pulleys are arranged between the parallel sidewalls 64 and 65 of a substantially triangularly shaped housing 66 (not shown in FIGS. 1, 2 and 5) and serve to advance and guide the belt along a substantially triangular path near the periphery of the housing. Drive pulley 61 is journaled for rotation with a drive shaft 68 which is driven by a belt-driven three element gear train 69, mounted on the rear side of a connecting arm 73. Belt 60 is driven in a direction to cause the belt to unwind film from the film roll when the belt is moved into frictional engagement with the roll. Gear train 69 may be driven by the main drive motor of the projector (not shown).

The entire film feeder assembly 30 is pivotally mounted about axis 35 by means of a U-shaped pivotal arm 70 comprising upper and lower bearing sleeves 71 and 72, respectively, and the connecting arm or member 73 from which the sleeves extend perpendicularly and in the same plane. Upper bearing sleeve 71 carries a pair of sleeve bearings 74 and 75 which are fitted over shaft 41 to permit low friction pivotal movement of arm 70 thereabout. Drive shaft 68 is supported on a pair of sleeve bearings 76 and 77 carried by lower bearing sleeve 67. The lower bearing sleeve protrudes through an arcuate slot 80 formed in the projector sidewall 44. Slot 80 has a center of curvature coinciding with axis 35, thereby permitting unhampered pivotal movement of arm 70 about shaft 41. The free-end of lower bearing sleeve 72 is rigidly coupled with the inner sidewall 65 of the film feeder housing. Conventional spring means shown diagrammatically at 82 in FIG. 3 are provided for biasing pivotal arm 70 for counterclockwise movement about shaft 41, as viewed in FIG. 3. In this manner, film feeder 30 is normally urged toward engagement with the film roll.

When in position in engagement with a film roll, as in FIGS. 1 and 2, the extent of pivotal movement of both the film feeder 30 and stripping finger 31 will be determined by the diameter of film roll 23, the roll acting as a stop when the rounded end portion 52 of stripper member 42 and that portion of belt 60 riding over idler pulley 62 engage the roll. By proper spacing of drive shaft 68 from axis 35 and by proper orienting of the film feeder housing 66 on the free-end of lower bearing sleeve 72, a channel 33 of substantially uniform dimension may be provided between the straight guide edge 51 of stripping member 42 and the reach of belt 60 extending between idler pulley 62 and drive pulley 61. Preferably, such channel has a width several times the thickness of the film, but not more than approximately 2 millimeters.

Upon being stripped from the film roll and guided along channel 33, the leading end of the film strip is fed into the entrance 85 of film guide 34, shown in FIG. 3. In order to provide a bounded film guide from the exit 86 of channel 33 to film guide entrance 85 when the stripping mechanism is acting upon film rolls of small diameter, in which case the stripping mechanism assumes a position approaching that shown in FIG. 2, an extension 87 is provided at the upper portion of film guide 34. Extension 87 is laterally adjacent channel 33 and extends a predetermined distance, dependent upon the extent of pivotal movement permitted the stripping mechanism, and provides an upper boundary of a film path leading from the channel exit 86 to the film guide entrance 85. To provide a lower boundary to such path, the film feeder housing is provided with an appendage 88 which extends toward the projector film guide and below such guide. Thus, regardless of the size of film roll 23 and the pivotal position of the stripping mechanism, a bounded or substantially closed film path is provided from the periphery of the film roll to the entrance of the projector film guide.

Preferably, after the leading edge of the film strip 22 has been stripped from the roll and guided along the threading path of the projector to the projection gate, the stripping mechanism is withdrawn from the film cartridge. Withdrawal is preferred to avoid any possibility of film scratching by the stripping elements 30 and 31. A solenoid, activated by the closure of a microswitch situated adjacent the threading path near the projection gate and activated by the passage of film thereover, may be used to overcome the spring bias on elements 30 and 31 so as to retain the stripping mechanism in the inoperative position shown in FIG. 5. Such an arrangement is disclosed in the aforementioned patent to McKee. In order to avoid a sharp bending of the film strip as it travels from deep within the film reel (as shown in phantom lines in FIG. 5) to the channel 33 over the rounded end portion 52 of the stripping member 42 and while member 42 is retracted, stripping member 42 can pivot about pin 43 against the force of spring 53 to a retracted position as shown in FIG. 5, the force for effecting such movement being diagrammatically illustrated at 92. Again, a solenoid-operated device or suitable mechanical means (such as a cam) can be employed to retain stripping member 42 in its retracted position with pin 56 abutting the upper end 55b of slot 55.

As is apparent from the foregoing description and from an examination of the drawings, the unique manner in which the driving and stripping elements of the stripping mechanism are pivotally mounted for movement about a common axis, permits the mechanism to pivot from a retracted position outside a cartridge to a position inside a cartridge wherein the mechanism is engageable with virtually any size film roll without significantly affecting the preferred parallel relationship between edge 51 of the stripping member and that reach of belt 60 extending between pulleys 61 and 62.

The invention has been described in detail with particular reference to a preferred embodiment thereof, but it will be understood that variations and modifications may be effected within the spirit and scope of the invention as described hereinabove and as defined in the appended claims.

I claim:

1. Apparatus for stripping and guiding flexible strip material from a roll of such material having a leading end, said apparatus comprising:

drive means movable for engaging and rotating the roll in an unwinding direction;

a stripper member movable for engaging the roll to deflect the leading end of the roll away from the roll periphery as the roll rotates in an unwinding direction; and means for mounting said drive means and stripper member for pivotal movement about a common axis into and out of engagement with the roll, whereby said drive means and stripper member can be both pivotally moved into engagement with the roll with predetermined relationship between the relative positions of said drive means and said stripper member.

2. Apparatus as set forth in claim 1 further comprising means coupled to said drive means for biasing said drive means toward engagement with the roll.

3. Apparatus as set forth in claim 1 further comprising means coupled to said stripping member for biasing said stripper member toward engagement with the roll.

4. Apparatus as set forth in claim 1 wherein said means for mounting said drive means for pivotal movement about said axis comprises:

a substantially U-shaped pivot arm including a pair of spaced members which extend in a common plane perpendicularly from the opposite ends of an interconnecting member, said drive means being attached to a free end of one of said perpendicularly extending members, and means for mounting the other of said perpendicularly extending members for rotation about said common axis so that said interconnecting member extends perpendicularly from said common axis and is pivotal thereabout.

5. Apparatus as set forth in claim 1 wherein a portion of said drive means and a portion of said stripper member define a passageway through which said material can be guided away from the periphery of said roll after said material is stripped from the roll.

6. For use in a motion picture projector comprising means for supporting a roll of film having a leading edge, a projection gate, and guide means defining a path along which film can be advanced toward the projection gate upon being unwound from the roll, the improvement comprising:

a stripper finger having an end portion adapted to engage the film roll during rotation thereof to deflect the leading edge of the film away from the roll, the finger having a substantially straight edge portion extending from said end portion along which the leading edge of the film can be guided toward the projector guide means upon being deflected by said end portion;

first mounting means for pivotally mounting said stripper finger for movement about an axis offset from said end portion whereby said stripper finger end portion can be pivoted into engagement with the film roll;

means for biasing said stripper finger for pivotal movement about said axis toward engagement with the film roll;

driving means for rotating the roll in an unwinding direction to move the leading end of the film toward engagement with said stripper finger end portion while said member is in engagement with the roll, said drive means comprising a substantially straight portion adapted to cooperate with said stripper finger edge portion to define a narrow passageway for guiding the leading edge of film toward the projector guide means;

second mounting means for pivotally mounting said driving means for movement about said axis whereby said driving means can be pivoted into engagement with the film roll and said straight portion thereof can be positioned substantially parallel to said stripper finger straight edge portion when said driving means and stripper finger both are engaging the film roll; and means for biasing said driving means for pivotal movement about said axis toward engagement with the film roll.

7. The improvement set forth in claim 6 wherein said driving means comprises; an endless belt, a plurality of pulleys about which said belt is trained, a drive shaft on which one of said pulleys is journaled for rotation, said drive shaft being substantially parallel to said axis about which said drive means is pivotally mounted, and means for rotating said drive shaft in a direction to cause said belt to rotate the film roll in an unwinding direction when said belt is pivoted into frictional engagement with the roll.

8. The improvement set forth in claim 7 wherein said second mounting means comprises means for pivotally mounting said drive shaft for movement about said axis.

9. The improvement set forth in claim 6 further comprising means for disengaging said tripper finger and said driving means from the film roll, and means for widening said passageway along a major portion of its length upon guiding the leading edge of the film a predetermined distance from the roll.

10. The improvement set forth in claim 6 wherein said stripper finger comprises a support arm and a stripping member, said arm being pivotally mounted for movement about said axis, and said stripping member is comprised of said end portion and said straight edge portion, said stripping member being pivotally mounted on said support arm and movable between first and second positions, whereby said straight edge portion can define a portion of said narrow passageway when said stripping member is in said first position and can define a portion of a widened passageway when said stripping member is in said second position.

* * * * *